Patented July 13, 1948

2,445,128

UNITED STATES PATENT OFFICE 2,445,128

BIOLOGICAL PROCESS FOR THE PRODUCTION OF RIBOFLAVIN

Fred W. Tanner, Jr., Lynferd J. Wickerham, and James M. Van Lanen, Peoria, Ill., assignors to the United States of America as represented by the Secretary of Agriculture No Drawing. Application January 11, 1946, Serial No. 640,645

8 Claims. (Cl. 195—28)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

This invention relates to the production of riboflavin (vitamin $B_2$) by the fermentation of nutrient mashes with the yeast, *Ashbya gossypii*.

This organism in previous investigations (Guilliermond, Fontaine, and Raffy, 1935) has been found capable of elaborating only traces of riboflavin even after long periods of incubation. We have found a method of increasing the production of this vitamin more than one hundred fold.

In accordance with our invention, yields of riboflavin may be obtained in the neighborhood of 300 to 400 $\mu$g. per ml. of culture liquor or from 20,000 to 40,000 $\mu$g. per gram when expressed on the basis of dry residual solids.

In general, our process comprises preparing a medium containing fermentable sugar, assimilable nitrogen, preferably in the form of partially degraded plant and/or animal proteins, lipids or fatty acids, vitamins and growth factors, and inorganic salts. This medium is sterilized and inoculated with an active culture of *Ashbya gossypii*. During the course of incubation, the culture is either aerated, or agitated in the presence of air, or both aerated and agitated. Aeration is preferably carried out by the direct introduction of sterile air into the fermentation vessel. After a period of from 4 to 7 days when the riboflavin yield approaches the maximum, the fermentation is discontinued and the riboflavin can be recovered by methods well known in the art.

The type, concentration, and balance of nutrients in this fermentation are very critical as is also the pretreatment of nutrients supplying nitrogen. Materials, such as corn steep liquor, peptone, yeast, and yeast products, distillers' byproducts, liver residues, animal tankage, and other plant and animal proteinaceous substances contain factors essential for vitamin synthesis by *Ashbya gossypii*. With some of the above nutrients, the desired factors are present in bound form and must be released by treatment with acids, alkalies, enzymes or combinations of these agents. These nutrients also contain factors which retard riboflavin formation although they do not influence growth, and the presence of these inhibitory materials in significant concentration must be avoided. Therefore, it is necessary in devising a suitable medium to employ nutrients and balance their concentrations so as to supply the required factors while substantially eliminating or inactivating the inhibitory substances.

The effect on riboflavin synthesis of varying the concentration of the nitrogen supplements is shown in the following example and table.

EXAMPLE 1

Three series of media varying in composition were prepared in 500 ml. flasks. Throughout the three series, the content of glucose was held constant at 4 grams per flask. In the first series, the content of corn steep liquor was held constant at 0.5 gram of dry corn steep liquor solids per flask, and the peptone concentration was varied from 0 to 2.0 grams per flask in steps as shown in Table A below. In the second series, the peptone concentration was held constant at 0.5 gram per flask, and the concentration of corn steep liquor solids was varied from 0 to 2.0 grams per flask as shown. In the third series, equal quantities of dry corn steep liquor solids and peptone were added to each flask in amounts varying from 0 to 2.0 grams of each constituent per flask. Water was added to each flask to give a total volume of 100 ml., and the contents of each flask was adjusted to pH 6.5 by addition of sodium hydroxide. All flasks were sterilized with steam at 15 lb. per square inch gage pressure for 30 minutes after which they were cooled and inoculated with 1 percent by volume of an active culture of *Ashbya gossypii*. The flasks were then incubated at 29° C. for 8 days during which time they were continuously shaken in a mechanical shaker. All experiments were conducted in duplicate, and the results given in Table A are averages of yields obtained in duplicate flasks.

Table A

| Concentration of medium ingredients | | | Yield of riboflavin |
|---|---|---|---|
| Glucose | Peptone | Corn steep liquor (dry basis) | |
| Percent | Percent | Percent | µg/ml. |
| 4.0 | None | 0.5 | 55 |
| 4.0 | 0.25 | 0.5 | 383 |
| 4.0 | 0.50 | 0.5 | 395 |
| 4.0 | 0.75 | 0.5 | 280 |
| 4.0 | 1.00 | 0.5 | 95 |
| 4.0 | 1.50 | 0.5 | 135 |
| 4.0 | 2.00 | 0.5 | 20 |
| 4.0 | 0.5 | None | 3 |
| 4.0 | 0.5 | 0.25 | 370 |
| 4.0 | 0.5 | 0.50 | 395 |
| 4.0 | 0.5 | 0.75 | 355 |
| 4.0 | 0.5 | 1.00 | 217 |
| 4.0 | 0.5 | 1.50 | 125 |
| 4.0 | 0.5 | 2.00 | 16 |
| 4.0 | 0.25 | 0.25 | 183 |
| 4.0 | 0.50 | 0.50 | 395 |
| 4.0 | 0.75 | 0.75 | 285 |
| 4.0 | 1.00 | 1.00 | 163 |
| 4.0 | 1.50 | 1.50 | 32 |
| 4.0 | 2.00 | 2.00 | 18 |

The results given in Table A demonstrate that the use of either peptone or corn steep liquor alone gave low yields of riboflavin. When used in combination, satisfactory yields were obtained with 0.25 to 0.75 percent peptone when corn steep liquor was present at a concentration of 0.5 percent or with 0.25 to .75 percent corn steep liquor when peptone was employed at a level of 0.5 percent. Higher levels of either corn steep liquor or peptone sharply reduced riboflavin synthesis. Since commercial peptones and corn steep liquor vary in composition, the ratios and quantities of ingredients required for maximum vitamin production have been found to vary and must be determined for each batch of material. The above example, therefore, is merely illustrative rather than limitative of the scope of our invention.

Other nitrogen sources may be used to replace peptone, especially after they have been subjected to treatment with acids, alkalies, or enzymes.

The application of commercial animal tankage is illustrated in the following example and table.

EXAMPLE 2

To each of twelve 500 ml. flasks were added 4 grams of glucose and a quantity of corn steep liquor to provide 0.5 gram of dry solids. To one series of flasks, untreated tankage was added in amounts varying from 0.25 to 0.75 gram per flask, and to a second series, tankage which had been acid hydrolyzed was added in the same varying levels as shown in the table below. The method of acid hydrolysis consisted of autoclaving 10 grams of tankage in 50 ml. of 2 N hydrochloric acid for 30 minutes at 121° C. All media were adjusted to pH 6.5, and the volume contained in each flask was made to 100 ml. with water. After sterilization with steam at 15 lb. per square inch gage pressure for 30 minutes, the flasks were cooled and inoculated with 1 percent by volume of an active culture of *Ashbya gossypii*. After 8 days incubation under continuous shaking at 29° C., the yields of riboflavin were determined. All experiments were conducted in duplicate, and the results given in Table B are the averages from duplicate flasks. These results demonstrate the value of tankage and its enhancement by treatment with acid. Similar hydrolysis with sodium hydroxide or with the enzyme papain also results in marked improvement of tankage and other nitrogen supplements.

Table B

| Concentration of medium ingredients | | | Yield of riboflavin |
|---|---|---|---|
| Glucose | Corn steep liquor (dry substance) | Commercial tankage, | |
| Percent | Percent | Percent | µg/ml. |
| 4.0 | 0.5 | 0.25 | 120 |
| 4.0 | 0.5 | 0.50 | 9 |
| 4.0 | 0.5 | 0.75 | 4 |
| 4.0 | 0.5 | ¹ 0.25 | 277 |
| 4.0 | 0.5 | ¹ 0.50 | 140 |
| 4.0 | 0.5 | ¹ 0.75 | 136 |

¹ Acid treated.

While the above examples employ 4 percent glucose, carbohydrate levels from 0.5 to 10 percent may be used satisfactorily. We prefer to employ from 1 to 4 percent depending upon the method and rate of aeration. Fermentable sugars other than glucose may be used, such as sucrose and maltose 0.25 to 5.0 percent proteinaceous material is employed.

Other nutrients which favor the synthesis of riboflavin by *Ashbya gossypii* are lipids and their derivatives. For example, corn oil at a concentration of 0.1 percent in the mash increases the yield approximately 25 percent. Inorganic salts, such as calcium carbonate and calcium chloride, when added at levels between 0.1 and 1.0 percent and monopotassium phosphate at levels between 0.1 and 1 percent also enhance riboflavin synthesis and may be added to the medium as well as such trace elements as copper, iron, manganese, and zinc, which are usually present in other medium constituents.

Aeration is preferably accomplished by passage of sterile air into the fermenting medium. It is desirable to disperse the air by employing spargers of porous stone, carborundum, or perforated pipe. Agitation during the course of aeration is also recommended. The volume of air required may range from 10 to 100 percent of the volume of mash per minute, depending upon the culture, the medium, and the type of fermenting vessel.

Mashes may be adjusted to an initial pH of from 5.0 to 7.5 although this range may be extended to initial pH values of from 4.0 to 8.0 without substantially reducing the efficiency of the process. The pH during the early stage of growth drops to approximately 4.5 and then rises gradually to a final value of from 6.5 to 8.0.

*Ashbya gossypii* grows and elaborates riboflavin at temperatures from 15° to 40° C. However, the optimum temperature lies between 24° and 30° C.

The period of incubation varies with the temperature, inoculum size, aeration rate, and nutrients. Generally, the vitamin potency is highest after 96 to 144 hours.

The inoculum may consist of 0.5 to 10 percent by volume of a liquid culture, 1.0 to 2.0 percent being preferred. The age of inoculum may vary from one day to several days.

Having thus described our invention, we claim:

1. The method of producing high yields of riboflavin comprising cultivating *Ashbya gossypii* under aerobic conditions in a growth medium comprising 0.5 to 10.0 percent fermentable carbohydrate, a proteinaceous material, and a lipid.

2. The method of producing high yields of riboflavin comprising cultivating *Ashbya gossypii* under aerobic conditions in a growth medium comprising a fermentable carbohydrate, 0.25 to 5.0 percent proteinaceous material, and a lipid.

3. The method of producing high yields of riboflavin comprising cultivating at a temperature of 15° to 40° C. *Ashbya gossypii* under aerobic conditions in a growth medium comprising 0.5 to 10.0 percent fermentable carbohydrate, 0.25 to 5.0 percent proteinaceous material, and a lipid.

4. The method of producing high yields of riboflavin comprising cultivating *Ashbya gossypii* under aerobic conditions in a growth medium comprising 0.5 to 10 percent glucose, corn steep liquor and peptone.

5. The method of producing high yields of riboflavin comprising cultivating *Ashbya gossypii* under aerobic conditions in a growth medium comprising 0.5 to 10 percent glucose, corn steep liquor and hydrolyzed animal tankage.

6. A process of preparing riboflavin comprising cultivating *Ashbya gossypii* under aerobic conditions in an aqueous growth medium comprising 0.5 to 10 percent of a fermentable sugar, corn steep liquor, and proteinaceous material.

7. A process of preparing riboflavin comprising cultivating *Ashbya gossypii* under aerobic conditions in an aqueous growth medium comprising 0.5 to 10 percent glucose, 0.25 to 0.75 percent peptone, and 0.25 to 0.75 percent corn steep liquor (dry basis).

8. A process of preparing riboflavin comprising cultivating *Ashbya gossypii* under aerobic conditions in an aqueous growth medium comprising 0.5 to 10 percent glucose, 0.25 to 1 percent peptone, and 0.25 to 1 percent corn steep liquor (dry basis).

FRED W. TANNER, Jr.
LYNFERD J. WICKERHAM.
JAMES M. VAN LANEN.

REFERENCES CITED

The following references are of record in the file of this patent:

UNITED STATES PATENTS

| Number | Name | Date |
|---|---|---|
| 2,374,503 | Rudert | Apr. 24, 1945 |
| 2,400,710 | Piersma | May 21, 1946 |

OTHER REFERENCES

Schopfer, Helvetica Chimica, Acta V. XXVII, pp. 1017 to 1032.

Guilliermond, Comptes Rendus, T 200, Apr. 1935, pp. 1556 to 1558.